United States Patent [19]
Kellogg et al.

[11] Patent Number: 5,302,295
[45] Date of Patent: Apr. 12, 1994

[54] METHOD OF SLUDGE REMOVAL

[75] Inventors: Stephen R. Kellogg, Stratford; Ralph A. Klass, New Milford, both of Conn.

[73] Assignee: YWC Technologies, Trumbull, Conn.

[21] Appl. No.: 997,877

[22] Filed: Dec. 29, 1992

[51] Int. Cl.⁵ ............................................. C02F 11/14
[52] U.S. Cl. ................................... 210/710; 210/727; 210/728; 210/732; 210/734; 210/747; 405/64; 405/129
[58] Field of Search ................. 37/58; 210/609, 702, 210/710, 727, 728, 732, 734, 747, 170, 242.1; 405/64, 128, 129

[56]  References Cited
U.S. PATENT DOCUMENTS

| | | | |
|---|---|---|---|
| 3,709,792 | 1/1973 | Hampton | 210/7 |
| 3,994,806 | 11/1976 | Rausch et al. | 252/325 |
| 4,046,683 | 9/1977 | Tsunoda et al. | 210/20 |
| 4,053,401 | 10/1977 | Fukushima et al. | 210/52 |
| 4,225,431 | 9/1980 | DeLonge | 210/617 |
| 4,276,164 | 6/1981 | Martone et al. | 210/170 |
| 4,288,174 | 9/1981 | Laws | 405/129 |
| 4,377,477 | 3/1983 | Dunkers | 210/170 |
| 4,501,446 | 2/1985 | Glaser et al. | 210/747 |
| 4,664,792 | 5/1987 | Fors et al. | 210/242.1 |
| 4,818,390 | 4/1989 | Manchak, Jr. | 210/170 |
| 4,820,424 | 4/1989 | Field et al. | 210/716 |
| 4,826,601 | 5/1989 | Spratt et al. | 210/610 |
| 4,944,872 | 7/1990 | Kantor | 210/242.1 |
| 5,023,012 | 6/1991 | Buchan et al. | 252/181 |
| 5,026,485 | 6/1991 | Anderson | 210/723 |
| 5,076,940 | 12/1991 | Boutin et al. | 210/716 |
| 5,143,623 | 9/1992 | Kroll | 210/242.1 |

Primary Examiner—Peter A. Hruskoci
Attorney, Agent, or Firm—Fish & Richardson

[57]  ABSTRACT

The invention provides a method for removing a solid material, e.g., sludge, from the bottom of a body of water. The method includes the steps of: a) placing a turbidity curtain of water impermeable material about a first minor portion of a body of water, the curtain extending from the surface to the bottom of the body and defining a first cell, b) pumping sludge from the first cell, c) placing a turbidity curtain around a second minor portion of the body of water, the curtain extending from the surface to the bottom of the body and defining a second cell, d) pumping sludge from the second cell after pumping from the first cell has ceased, e) after the resuspended solids in the water in the first cell have been allowed to settle for a predetermined time after pumping, moving the first cell to a different location in the body of water, and f) repeating steps d) and e) with the first cell, after being moved, becoming the second cell and the second cell becoming the first cell. Step f) is repeated until all, or a desired portion, of the body of water has been dredged.

20 Claims, 4 Drawing Sheets

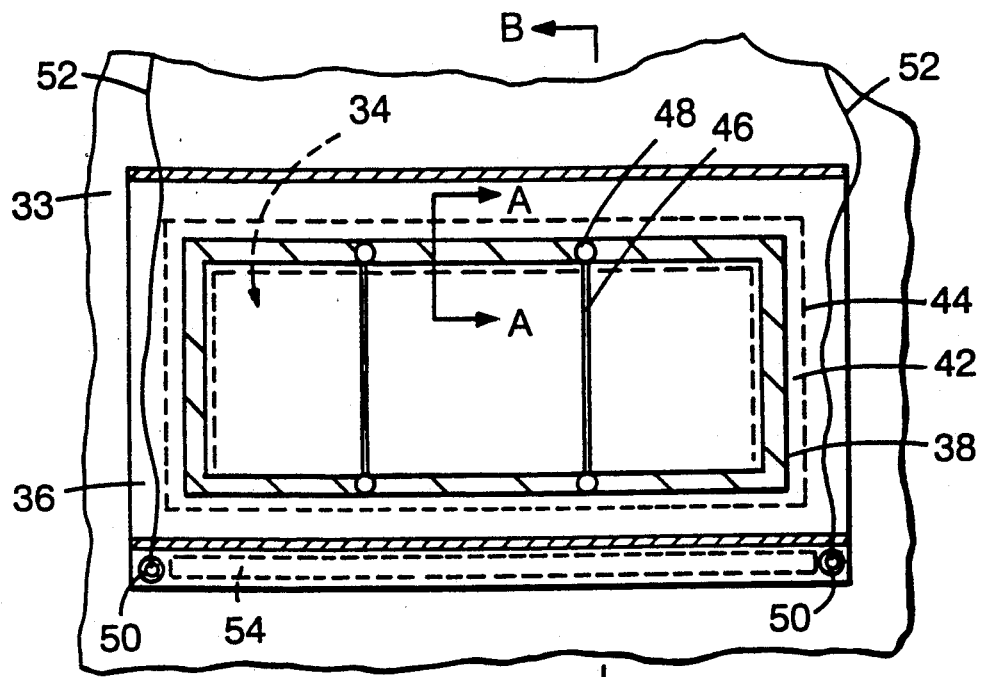
FIG. 3
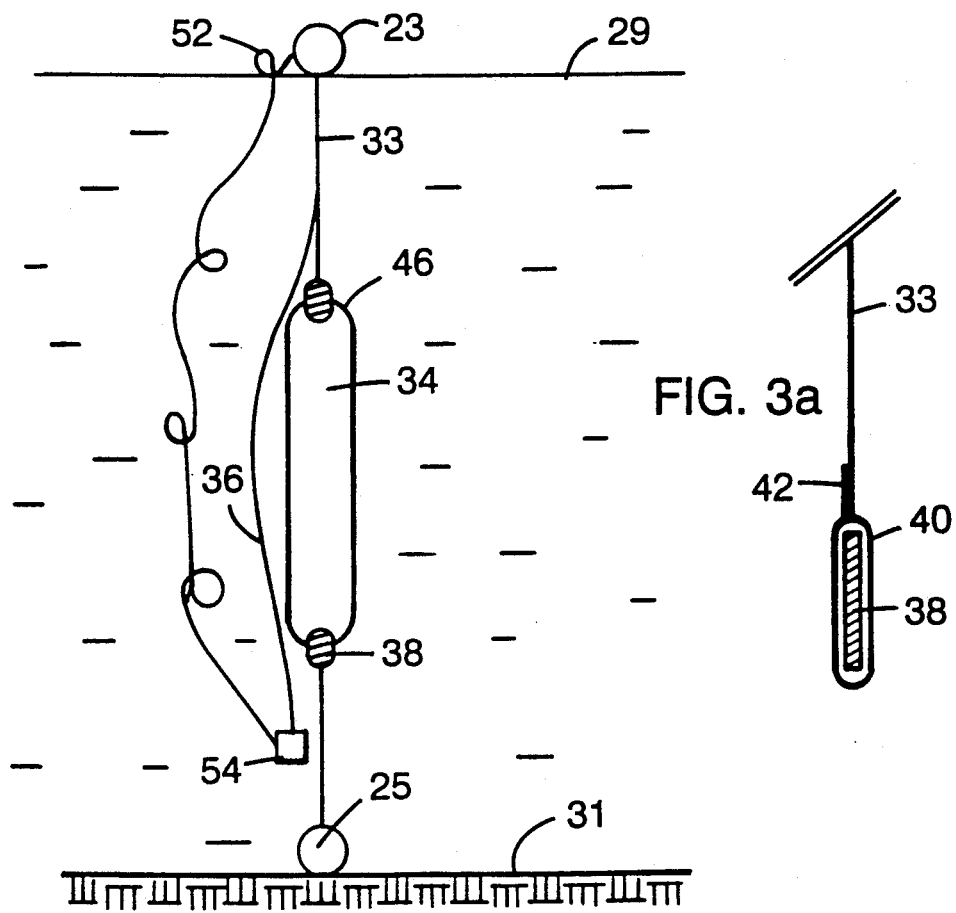
FIG. 3a
FIG. 3b

METHOD OF SLUDGE REMOVAL

BACKGROUND OF THE INVENTION

The present invention relates to methods for removing sludge from bodies of water, e.g., wastewater lagoons.

Wastewater from chemical processes, e.g., paper manufacture, has long been treated by directing the wastewater through a hold/release basin or "lagoon" in which solids suspended in the wastewater settle, forming a sludge on the bottom of the lagoon, and discharging the water into a river or ocean. Wastewater typically flows into the lagoon continuously, or periodically on a continuous basis, and is discharged continuously or periodically, e.g., based on the tides if the lagoon is located in a coastal region.

Both the time which the wastewater spends in the lagoon prior to discharge (retention time) and the velocity of the wastewater as it passes through the lagoon affect the amount of solids which are able to settle, and thus the amount of solids which are discharged with the water. As sludge builds up on the bottom of the lagoon, the retention time of the lagoon is decreased and the velocity of wastewater through the lagoon increased, causing less of the suspended solids to settle prior to discharge. The buildup of sludge will thus eventually cause the suspended solids in the discharged wastewater to exceed acceptable levels. This causes a particular problem in applications where the suspended solids are hazardous to the environment, e.g., dioxin-containing solids generated in paper processing.

It is thus necessary to periodically remove sludge from the bottom of the lagoon, if the lagoon is to remain in use indefinitely. Removal has been attempted in the past by simple dredging, i.e., by pumping sludge up from the bottom of the lagoon. Dredging has proved unsatisfactory for use in many wastewater processing lagoons, however, as large quantities of sludge are stirred up from the bottom of the lagoon and resuspended in the water, contaminating the entire lagoon and resulting in unacceptable levels of suspended solids in the discharged water.

SUMMARY OF THE INVENTION

The present invention provides a method for removing a solid material, e.g., sludge, from the bottom of a body of water, e.g., a wastewater lagoon, which minimizes contamination of the water by the solid material during removal. The method of the invention allows a water treatment process to continue uninterrupted during sludge removal, without the level of suspended solids in the discharged water exceeding acceptable levels.

In one aspect of the invention, the method includes the steps of: a) placing a turbidity curtain of water impermeable material about a first minor portion of a body of water, the curtain extending from the surface to the bottom of the body and defining a first cell, b) pumping sludge from the first cell, c) placing a turbidity curtain around a second minor portion of the body of water, the curtain extending from the surface to the bottom of the body and defining a second cell, d) pumping sludge from the second cell after pumping from the first cell has ceased, e) after the resuspended solids in the water in the first cell have been allowed to settle for a predetermined time after pumping, moving the first cell to a different location in the body of water, and f) repeating steps d) and e) with the first cell, after being moved, becoming the second cell and the second cell becoming the first cell. Step f) is repeated until all, or a desired portion, of the body of water has been dredged.

In a preferred embodiment, the first and second cells are adjacent each other during most of the removal process. Preferably, the cells are moved to different locations in a "leapfrog" manner, whereby the cells adjoin each other along a first portion of their respective curtains, and, after pumping and settling, one of the cells is moved to adjoin the other cell along a second portion of the other cell's curtain, distant from the first portion. The cell which is moved is the cell which was pumped first, and has thus had time to settle.

In the preferred embodiment, a filtrate settling cell is also provided in the body of water, isolated from the first and second cells and distant from the area where water is discharged from the body of water. Pumped sludge is treated with a flocculating agent and the solid material is allowed to settle from the water (supernatant). The supernatant from the pumped sludge is transferred to the settling cell, while the solid material is further dewatered on a wire press. Additional liquid removed on the wire press (filtrate) is also transferred to the settling cell. A filtrate holding tank may be provided, distant from the body of water, to receive liquid discharged from the wire press prior to its transfer to the settling cell. In the filtrate holding tank solids can be separated from the supernatant (or filtrate) and returned to the wire press for further dewatering. The settling cell serves to allow substantially all remaining solids in the supernatant and filtrate to settle prior to discharge of the supernatant from the body of water.

Preferably, the method further includes the step of maintaining the water level in each of the two cells substantially constant relative to the water level outside the cells throughout the process, preventing the curtains forming the cells from collapsing. In one embodiment, in which the cells are adjacent each other, fluid level control is provided by a plurality of openings in each cell, which openings include flow control means for controlling the direction of fluid flow. Fluid communication is provided between the two cells, and one-way flow can be provided by the flow control means at selected openings, selectively allowing water to flow into the cells while preventing outward flow. One-way flow is typically provided to the openings in a cell which open into the body of water while the cell is being dredged and for a predetermined time thereafter.

In an alternate embodiment, the fluid level control is provided by a regulator system which pumps water into the cell from which sludge is being pumped to replace the volume of water and sludge which is being removed.

In a further preferred embodiment, a flocculating agent is added to the water in the previously pumped cell, which is no longer being pumped, during pumping of the other cell. The flocculating agent causes the solids in the water to settle rapidly, shortening the time required for settling of the material resuspended by dredging, and thus the time between pumping operations. In the embodiment in which the cells are in fluid communication, the flocculating agent is preferably added close to the area of communication, so that contaminated water flowing from the cell being pumped into the other cell will be immediately contacted by the flocculating agent. Preferred flocculating agents include nonionic polymers, preferably polyacrylamides. The flocculating agent may be used in combination with a coagulant, preferably a metal sulfate salt, more preferably ferrous sulfate.

BRIEF DESCRIPTION OF THE DRAWINGS

FIG. 3 is a fragmentary elevational view of an opening in a cell curtain according to one embodiment of the invention.

FIG. 3a is an enlarged cross-sectional view of the curtain of FIG. 3, taken along line A—A.

FIG. 3b is a reduced cross-sectional view of the curtain of FIG. 3, taken generally along line B—B.

DESCRIPTION OF THE PREFERRED EMBODIMENTS

Figures 1, 2:
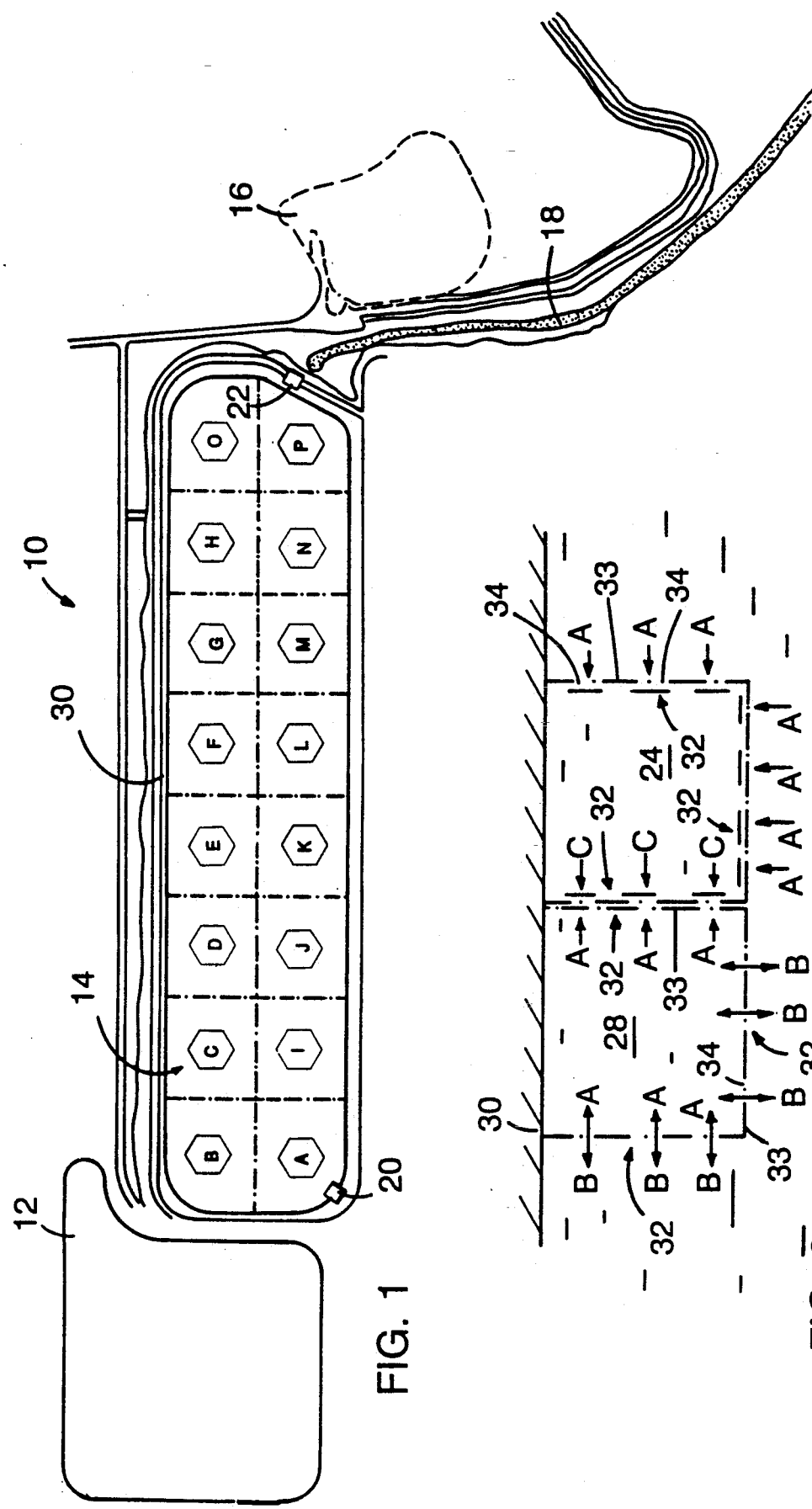
FIG. 1 is a schematic plan view of a water treatment area, including a layout for a sludge removal process according to one embodiment of the invention.
FIG. 2 is an enlarged schematic top view of a pair of cells according to one embodiment of the invention.

FIG. 1 illustrates a wastewater lagoon to be dredged. Water treatment area 10 includes staging area 12, in which dredging and pumping equipment are located, hold/release basin 14, through which wastewater passes for settling prior to discharge, and landfill 16, which receives the processed sludge.

Wastewater enters the hold/release basin at inlet 20, and is discharged at outlet 22, from which it flows though effluent discharge ditch 18 and, typically, into an ocean or river (not shown). If water is being discharged into the ocean, or a tidal estuary, discharge from outlet 22 will not be continuous, but will be timed to coincide with high tides for a predetermined time, typically about 2 hours with two tides per day.

In FIG. 1, hold/release basin 14 is divided into sixteen areas, labelled A-P, to illustrate the sequence in which the cells are preferably set up and dredged.

In most situations (unless a portion of the basin has been predredged) it is necessary to dredge substantially the entire basin. It is preferred that dredging begin on the inlet side of the basin, e.g., at area A in FIG. 1. A first cell 24 (as shown in FIG. 2) is thus established at area A. The area is defined as a cell by a turbidity curtain separating the cell from the remainder of the basin. In order to dredge area A, at the basin inlet, it is necessary to set up a bypass (not shown), e.g., with flexible piping, to direct wastewater from the inlet around the cell and into the basin. A second, initial trailing cell or advance cell 28 (FIG. 2) is set up in an area adjacent to one wall of cell A, preferably in area B in FIG. 1. After dredging of the first cell is completed, the cell in area B is dredged while the cell in area A (the first cell) is maintained in place as a trailing cell, until solids resuspended during dredging have time to settle.

In one embodiment, in which the cells are in fluid communication with each other, discussed below with reference to FIG. 4, after dredging is discontinued in area B, and after the resuspended solids have substantially settled in the cell in area A, the cell in area B is maintained in place as a new trailing cell until resuspended solids in that cell have settled, and the first cell is moved from area A to area C and becomes a new dredging cell. In an alternate embodiment in which the dredging and trailing cells are not in fluid communication, discussed below with reference to FIG. 5, the trailing cell may be moved immediately after the resuspended solids in that cell have settled.

After dredging, a settling cell 56 (see FIGS. 4 and 5) is provided in area B. The settling cell remains in place throughout the dredging process to receive the supernatant removed from the sludge after dredging and to permit settling of any resuspended solids in the supernatant. The settling cell, like the other cells, is defined by a turbidity curtain separating the settling cell from the remainder of the basin. (Preferably, during the dredging of areas A and B, a temporary settling cell is provided in another area of the basin, distant from the outlet.)

The first and second cells are moved as described above, with each cell acting first as a dredging cell and then as a trailing cell, and then being moved, in the order shown, until area H is reached. At this point, in the embodiment in which the dredging and trailing cells are in fluid communication, both cells are allowed to settle for a predetermined time, preferably at least 24 hours, after which both cells are moved to areas I and J. If the cells are not in fluid communication, each cell can be moved as soon as the resuspended solids in that cell have settled. After the cells are moved to areas I and J, the process which took place between areas C-H is repeated in cells I-N. When cell N is reached, dredging may, if desired, be discontinued, as typically there is minimal sludge accumulation in areas 0 and P, nearest the outlet 22, and dredging in these areas carries the highest risk of contamination reaching the outlet. If dredging is to be performed in area P, this must either be done during a plant shut-down, when discharge can be discontinued, or a bypass must be set up between the body of water and the discharge ditch.

Dredging in an order similar to that illustrated is preferred, as it minimizes disruption of the flow of water from the inlet to the outlet. However, the dredging and trailing cells could be set up in other configurations, and would not have to be moved in the "leapfrog" manner illustrated. The cells need not be square, as illustrated, but could have any desired shape, e.g., round or polygonal. Square or rectangular cells are typically preferred to facilitate division of the body of water into areas so that substantially the entire bottom of the body of water is dredged.

In a preferred embodiment, during the major portion of the dredging operation, the two operating cells are arranged adjacent each other, as a dredging cell 24 and a trailing cell 28, shown schematically in FIG. 2, e.g., cells C and D of FIG. 1. Cells 24, 28 are formed in the body of water to be dredged. Both cells are disposed adjacent the berm 30 (the bank of basin 14) which forms one wall of the cell, and each cell has three walls 32 which comprise impermeable turbidity curtains 33. In a particular embodiment, the impermeable curtains are made of 23 mil polyvinyl chloride (PVC) coated polyester reinforced material. Suitable floating baffle curtains are commercially available from Environetics, Inc., Lockport, Ill., under the trademark DIRECTOR. Referring to FIG. 3b, each curtain is supported at the water surface 29 by floatation collar 23, and extends downward to the bottom of the basin 31 where it is weighted by bottom ballast 25.

A dredge pipe or hose 37 (FIGS. 4 and 5) is placed in the dredging cell 24, and sludge is pumped from the bottom of the cell. During dredging, water is not allowed to flow directly out of the dredging cell 24 to the body of water, and is only allowed to flow from the dredging cell to the trailing cell (arrows C) during hold-/release basin discharge (e.g., about 2 hrs., twice a day). Water is, however, allowed to flow into the dredging and trailing cells (arrows A), to replace the volume of sludge and water removed by dredging. During dredging, water is not allowed to flow out of the trailing cell, except during basin discharge events, until substantial settling of resuspended solids has occurred after dredging is completed in the now trailing cell, e.g., after 24 hours. Thereafter, water is allowed to flow in and out of the trailing cell (arrows A←→B). The time at which substantial settling has occurred will be determined based on when the amount of particulate matter remaining in the water is found to be within acceptable limits, e.g., as established by environmental regulations. The suspended particulate matter (total suspended solids or TSS) may be determined directly, or by measuring the turbidity of the water by conventional methods and correlating this with the TSS. Typically, a TSS of less than 20 ppm is required for discharge into surface waters.

Dredging continues until the bottom of the basin or a desired depth is reached. (The depth may be determined by soundings, empirically by dredging until the dredge hits bottom or pumps sand from the bottom, by pre-calculation, or by other conventional means.) Dredging is then discontinued, and the dredge is removed from the dredging cell.

After a further time, the initial trailing cell is moved to a second location, adjacent a different portion of the dredging cell, the trailing cell, in its new location, becomes the dredging cell, and the dredge is moved to the new dredging cell. Similarly, the initial dredging cell becomes the trailing cell, and thus the solids suspended by dredging have further time to settle while the new dredging cell is being dredged.

The direction of flow in and out of the cells is controlled by a plurality of windows or openings 34 (FIG. 3) in each curtain, each opening having a flap 36, located on the inside of the cell, capable of acting as a one-way check valve. Flap 36 may be lowered (as shown in FIG. 3b, and in the dredging cell in FIG. 1), so that it allows water to flow into the cell (arrows A, FIG. 2) as the water level inside the cell drops due to the volume removed during dredging (or the water level outside the cell increases), but seals against the curtain to prevent outflow of water if the water level outside of the cell drops. The flaps between the dredging and trailing cell are typically down during dredging, but raised prior to discharge events. Flaps 36 in the trailing cell are typically raised a predetermined time (e.g. 24 hours) after dredging has been discontinued and settling of suspended material has occurred, and remain raised until the trailing cell is moved, allowing water to flow freely in both directions (arrows A←→B, FIG. 1).

Opening 34 and flap 36 are shown in detail in FIGS. 3–3b. Opening 34 is reinforced to prevent tearing of the curtain, preferably by polyester webbing 38 disposed in pocket 40 (see FIG. 3a) around the circumference of opening 34. Pocket 40 is preferably formed by heat sealing the curtain material to itself, forming seal area 42. In a preferred embodiment, the opening is about 8.0 feet wide by 1.0 feet high, the webbing is about 2" wide, and the seal area is about 2" wide. Generally, the openings are sized to provide a flow velocity through each opening during basin discharge events, with the flap raised, of less than about 1 foot/second, preferably less than about 3 inches/second. The top of each opening is typically about 6 inches below the top of the curtain. One or more rope loops 46 (2 are shown in FIG. 2) may, optionally, be included to maintain the shape of the window. Loops 36 are threaded through grommets 48, and are preferably formed from polypropylene rope, the ends of which may be heat sealed, spliced, or joined in any conventional manner.

Flap 36 includes grommets 50 and lifting lines 52, which enable the flap to be raised from above the surface of the water. Any other suitable means could be used to raise the flap. Ballast bar 54 weights the flap, and facilitates sealing of the flap against the curtain.

The settling cell (provided in area B of FIG. 1) is constructed of impermeable curtains, similar to the curtain shown in FIG. 2, and may include similar openings and flaps (which would typically remain raised). Preferably, the settling cell may include a plurality of openings larger than those in the dredging/trailing cells, sized to accommodate maximum flow conditions, e.g., when water removed during dredging continues to be sent to the filtrate settling cell during a basin discharge event. The openings typically do not have flaps.

Figure 4:
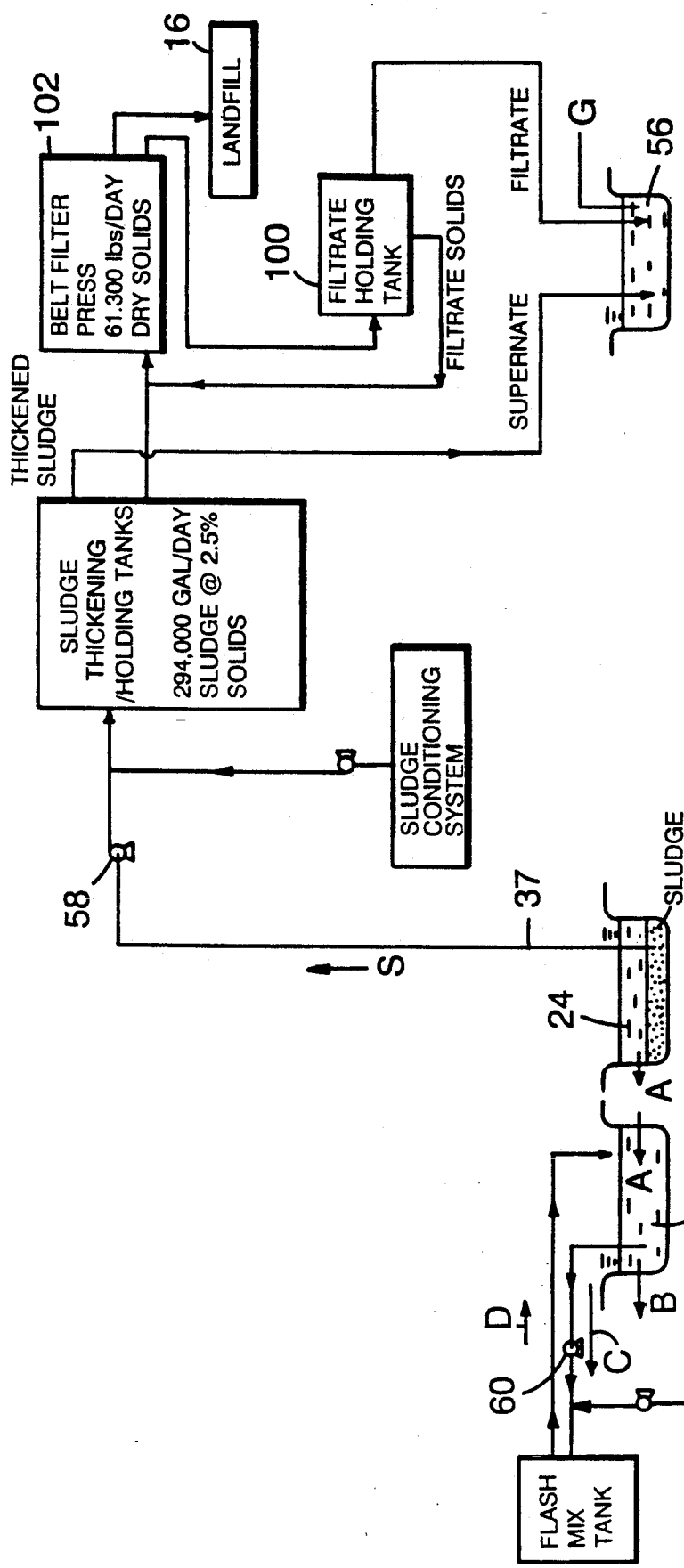
FIG. 4 is a flow diagram of a sludge removal process according to one embodiment of the invention.

FIG. 4 shows a flow-chart representation of a dredging process according to one embodiment of the invention, in which there is fluid communication between the dredging and trailing cells. In this embodiment, sludge is pumped from dredging cell 24 (arrow S) by dredge pump 58, typically at a rate of about 500 gallons/minute (based on a solids content in the sludge of about 2.5% by weight). Sludge is pumped to a sludge conditioning system, in which it is mixed with a flocculating agent and a coagulant, then to sludge thickening/holding tanks. In the holding tanks, liquid supernatant is removed from the sludge and sent to the filtrate settling cell 56 (area B in FIG. 1). The thickened sludge is then passed to a filter press where further liquid is removed and sent to a filtrate holding tank 100. Supernatant from the filtrate holding tank is also sent to the filtrate settling cell and solids are returned to the filter press 102. After the sludge has been substantially dewatered and solidified, it is sent to landfill 16 for permanent storage. Supernatant from the filtrate settling cell flows into the hold/release basin as indicated by arrow G.

While dredging is taking place in the dredging cell, liquid flows from the dredging cell to the trailing cell during periods when the hold/release basin is discharging, as indicated by arrows A. Because this water will contain considerable amounts of suspended solids, it is also treated with a flocculating agent and a coagulant as soon as it enters the trailing cell. In order to treat the incoming water with flocculating agent, the water which is near to the openings at the opposite side of the trailing cell, and thus is less contaminated, is pumped out of the cell (arrow C) by recirculation pump 60, mixed with the flocculating agent (and coagulant if desired) in a flash mix tank, and returned to the trailing cell (arrow D) at a location close to the area where water is entering from the dredging cell. During basin discharge events and after a predetermined time, e.g., 24 hours, after dredging is discontinued, after being treated with the flocculating agent and settling, water flows out of the trailing cell, into the hold/release basin, as indicated by arrow B.

In all of the processing steps in which flocculating agent is utilized, the flocculating agent is preferably a nonionic polymer, more preferably polyacrylamide, and is preferably provided in a concentration of about 36 mg/l based on a wastewater solids level of 4000 mg/l (in general, the amount of flocculating agent required will be directly proportional to the solids level in the wastewater or sludge to be treated, in approximately a 9:1000 ratio). A suitable flocculating agent is CLARI-FLOC® N-120P Polymer, available from Rhône-Poulenc, Inc., Parsippany, N.J. The flocculating agent, in all process steps in which it is used, may be used in combination with a coagulating agent. Preferred coagulating agents include metal sulfate salts, more preferably ferrous sulfate, provided at a concentration of about 340 mg/l, based on a wastewater solids level of 4000 mg/l. A preferred coagulating agent is CLARIFLOC® C-5100 Coagulant (ferrous sulfate), also available from Rhône-Poulenc.

Figure 5:
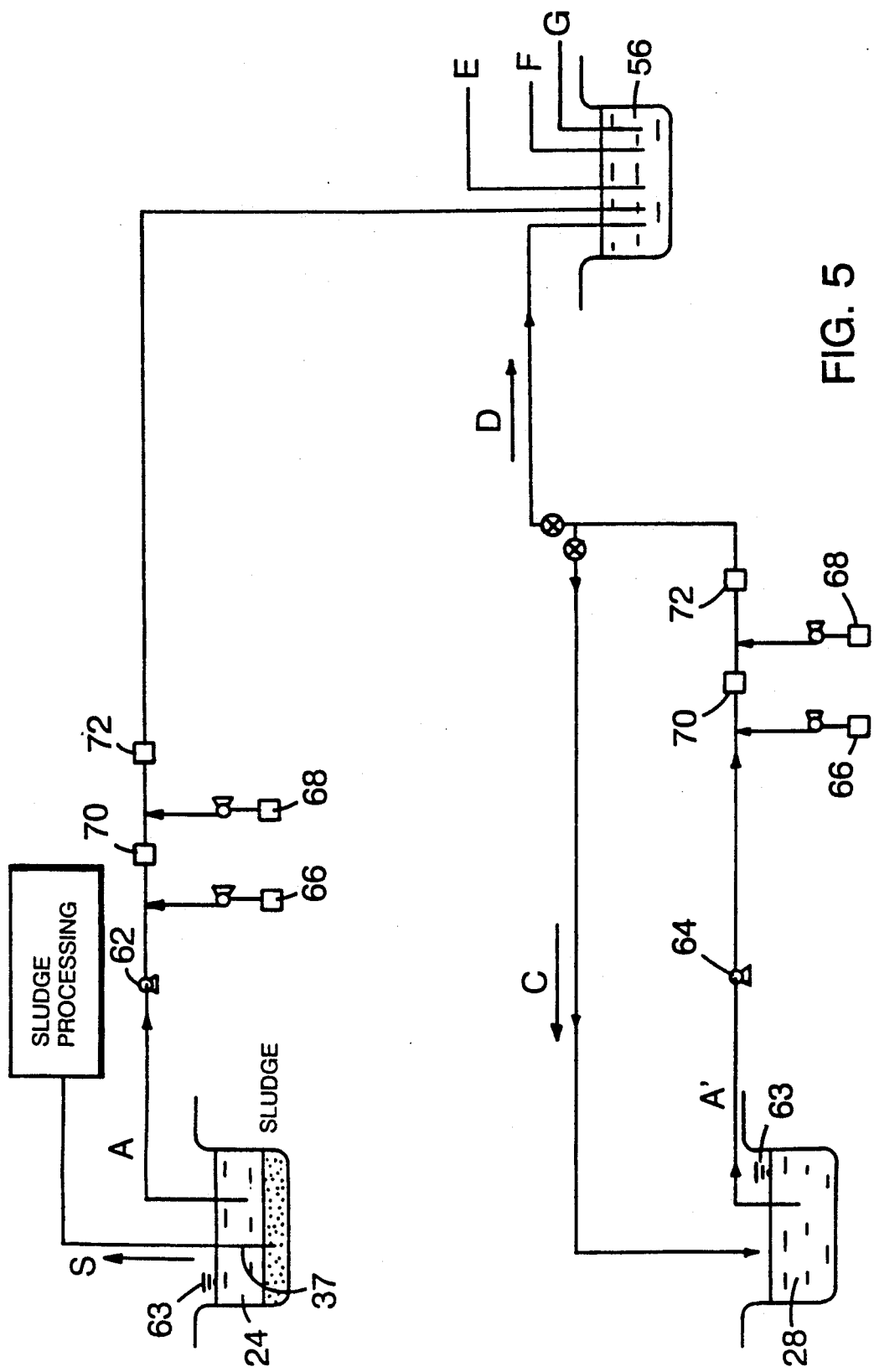
FIG. 5 is a flow diagram of dredging cell and trailing cell operation according to an alternate preferred embodiment of the invention.

An alternative preferred dredging process in which the dredging and trailing cells are not in fluid communication is shown in FIG. 5. In this embodiment, the fluid level within the cells, relative to the basin, is maintained substantially constant during dredging and basin discharge events by a sensor/pump arrangement, rather than by fluid communication between the cells. Sludge is pumped from the dredging cell 24 and treated in a manner identical to that shown in FIG. 4 (the pumping and sludge treatment process is indicated schematically in FIG. 5 by arrow S). During basin discharge events, water is withdrawn from the dredging cell (arrow A) and treated with a coagulating agent, supplied by tank 66 and mixed in flash mixer 70, and a flocculating agent, supplied by tank 68 and mixed in flash mixer 72, as described above. As described above with reference to the embodiment shown in FIG. 4, preferred flocculating agents include nonionic polymers, more preferably polyacrylamide; preferred coagulating agents include metal sulfate salts, more preferably ferrous sulfate; preferred concentrations are about 36 mg/l of flocculating agent and 340 mg/l coagulating agent, based on a wastewater solids level of 4000 mg/l. The treated water is then sent to filtrate settling cell 56, where, with the supernatant from the sludge thickening and filtering processes (arrows E and F) it is allowed to settle further prior to discharge to the hold/release basin as indicated by arrow G. During normal operation, water is withdrawn from the trailing cell (arrow A'), treated with flocculating agent and coagulating agent as described above, and recirculated (arrow C). During discharge events, instead of being recirculated, the treated water is sent to the filtrate settling cell (arrow D). The amount of water which is withdrawn from each cell, and the amount recirculated to the trailing cell, is controlled by sensors 63 and level control pumps 62 and 64. Water is still allowed to flow into the cells from the body of water, which serves to maintain the water level within the cells constant relative to the level of the body of water.

Other embodiments are within the claims.

We claim:

1. A method for removing solid material comprising a sludge from the bottom of a body of liquid comprising the steps of:
    a) placing a turbidity curtain of liquid impermeable material about a first minor portion of the body of liquid, the curtain extending from the surface to the bottom of the body and defining a first cell,
    b) pumping sludge from the first cell and discharging said pumped sludge out of said body,
    c) placing a turbidity curtain around a second minor portion of the body of liquid, the curtain extending from the surface to the bottom of the body and defining a second cell,
    d) discontinuing the pumping of sludge from said first cell,
    e) thereafter pumping sludge from the second cell and discharging said pumped sludge out of said body,
    f) after solids resuspended in the liquid in the first cell as a result of pumping sludge therefrom have been allowed to settle for a predetermined time after pumping has been discontinued, moving the first cell to a different location in the body of liquid, and
    g) repeating steps d), e) and f) with the first cell, after being moved, becoming the second cell and the second cell becoming the first cell.

2. A method of claim 1 wherein step f) is repeated until solid material has been removed from a desired portion of bottom of the body of liquid.

3. A method of claim 1 further comprising the step of maintaining the liquid level in each of the two cells substantially constant relative to the liquid level outside the cells.

4. A method of claim 3 wherein the cells are adjacent each other and the liquid level is maintained constant by a plurality of openings in each cell, which openings include flow control means for controlling the direction of fluid flow, said openings providing fluid communication between the two cells, and one-way flow being provided by the flow control means at selected openings, selectively allowing liquid to flow into the cells while preventing outward flow.

5. A method of claim 4 wherein a flocculating agent is added to the cell which is not being pumped, close to the area of fluid communication between the cells, so that liquid flowing from the cell being pumped into the other cell will be immediately contacted by the flocculating agent.

6. A method of claim 3 wherein the liquid level is maintained constant by a regulator system which pumps liquid into the cell from which sludge is being pumped to replace the volume of liquid and sludge which is being removed.

7. A method of claim 1 wherein the first and second cells are adjacent each other during the removal process.

8. A method of claim 7 wherein the cells are moved to different locations in a manner whereby the cells adjoin each other along a first portion of their respective curtains, and, after pumping and settling, one of the cells is moved to adjoin the other cell along a second portion of the other cell's curtain, distant from the first portion.

9. A method of claim 1 or 8 wherein the cell which is moved is the cell which was pumped first, and has thus had the longest time to settle.

10. A method of claim 1 wherein a filtrate settling cell is provided in the body of liquid, isolated from the first and second cells and distant from the area where liquid is discharged from the body of liquid.

11. A method of claim 1 wherein the pumped sludge is treated with a flocculating agent.

12. A method of claim 1 further comprising the step of adding a flocculating agent to the liquid in the previously pumped cell, which is no longer being pumped, during pumping of the other cell.

13. A method of claim 10 or 11 wherein said flocculating agent is a nonionic polymer.

14. A method of claim 13 wherein said flocculating agent is a polyacrylamide.

15. A method of claim 14 wherein said coagulant is a sulfate salt.

16. A method of claim 15 wherein said sulfate salt is ferrous sulfate.

17. A method of claim 10 or 11 wherein the flocculating agent is used in combination with a coagulant.

18. A method of claim 1, wherein liquid is discharged from the body of liquid in a discharge area, the method further comprising the steps of: providing a settling cell, isolated from the first and second cells and distant from the discharge area; treating the pumped sludge with a flocculating agent and removing a first portion of liquid supernatant; pumping the liquid supernatant to the settling cell; drying the solid material, removing a second portion of liquid supernatant; and pumping the second portion of supernatant to the settling cell.

19. A method of claim 18 wherein said second portion of liquid supernatant is removed to a filtrate holding tank distant from said basin, for separation and removal of solids suspended therein, prior to pumping to the settling cell.

20. A method of claim 18 wherein said solid material is dewatered on a filter press.

* * * * *